United States Patent
Ravier

(10) Patent No.: US 6,799,876 B2
(45) Date of Patent: Oct. 5, 2004

(54) LIGHTING DEVICE WITH BEAM ORIENTATION ADJUSTABLE SUPPORT

(75) Inventor: Jean Paul Ravier, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 10/183,313

(22) Filed: Jun. 25, 2002

(65) Prior Publication Data

US 2003/0002288 A1 Jan. 2, 2003

(30) Foreign Application Priority Data

Jun. 29, 2001 (FR) .............................. 01 08904

(51) Int. Cl.[7] .............................................. F21V 21/14
(52) U.S. Cl. ................... 362/524; 362/523; 362/530; 362/419; 362/428
(58) Field of Search ................................. 248/483, 484, 248/200, 274.1, 276.1, 285.1, 286.1, 466, 475.1, 476, 479, 480, 481; 362/459, 487, 496, 506, 507, 508, 523, 524, 525, 528, 529, 530, 382, 418, 419, 421, 422, 424, 425, 427, 428, 512, 514, 515, 257, 277, 282, 284, 264, 270, 274, 275

(56) References Cited

U.S. PATENT DOCUMENTS

| | | | | |
|---|---|---|---|---|
| 4,574,334 A | * | 3/1986 | Igura | ........................ 362/515 |
| 4,580,202 A | * | 4/1986 | Morette | ....................... 362/549 |
| 4,954,933 A | | 9/1990 | Wassen | ........................ 362/66 |
| 5,003,436 A | * | 3/1991 | Yamada et al. | ............. 362/515 |
| 5,267,128 A | * | 11/1993 | Shamir et al. | .............. 362/505 |
| 5,331,519 A | * | 7/1994 | Fujino | ........................ 362/528 |
| 5,337,223 A | * | 8/1994 | Fujino | ........................ 362/530 |
| 6,550,948 B1 | * | 4/2003 | Filbrun et al. | .............. 362/523 |

FOREIGN PATENT DOCUMENTS

| | | |
|---|---|---|
| EP | 1 070 632 | 1/2001 |
| FR | 2 160 061 | 6/1973 |
| FR | 2 244 345 | 4/1975 |
| FR | 2 410 213 | 6/1979 |
| FR | 2 488 198 | 2/1982 |
| FR | 2 636 578 | 3/1990 |
| FR | 2 800 336 | 5/2001 |
| GB | 1 480 846 | 7/1977 |

* cited by examiner

Primary Examiner—Thomas M. Sember
Assistant Examiner—Ismael Negron
(74) Attorney, Agent, or Firm—Morgan & Finnegan, L.L.P.

(57) ABSTRACT

A lighting device, including an optical system capable of generating a light beam and consisting of a light source and of a reflector, the optical system being mounted on a chassis by way of a fixed point including a ball-joint articulation. The optical system is held on the chassis by a second elastic link and by a third link capable of being put into motion by an actuator.

20 Claims, 4 Drawing Sheets

LIGHTING DEVICE WITH BEAM ORIENTATION ADJUSTABLE SUPPORT

FIELD OF THE INVENTION

The present invention relates to a beam orienting adjustable support for lighting devices, capable, for example, of equipping motor vehicles.

BACKGROUND OF THE INVENTION

When it is desired to orient a lighting device in several non-coplanar directions, for example in elevation and in azimuth, it is possible to mount the lighting system in such a way that it is movable in rotation about two orthogonal axes, and to use two actuators in order to put the lighting system into motion about each of these two axes, so as to be able to direct the light beam generated by the lighting device in all directions, both horizontally and vertically as well as obliquely.

Cases do exist, however, in which it is desired that a light beam should be made able to move in two directions, and only in these two directions. Put another way, it is desirable for the light beam emitted by the lighting device to be able to be displaced along two lines, one of these lines being horizontal and the other vertical, for example, any other direction of the light beam not being desired.

It is then known to mount the lighting device on a frame in such a way that it is movable about an axis under the effect of an actuator, then to make the frame movable about a second axis, for example perpendicular to the first one, under the effect of a second actuator. Another known solution consists in assigning a lighting device, movable about a single axis, to each direction in which a movable lighting beam is required. It is therefore necessary to have as many lighting devices as lighting directions. These solutions prove to be expensive due to the multiplication of the headlamps and/or of the actuators which stems from it, and offer bulky, complex and unreliable systems.

OBJECT OF THE INVENTION

The present invention lies in this context, and its object is to provide a lighting device with variable orientation along two axes, using only a single actuator to put the lighting device into motion along these two axes, the movements thus achieved having the desired accuracy, the device which causes the movement being reliable in operation, easy to assemble, compact and inexpensive.

DISCUSSION OF THE INVENTION

Thus the subject of the present invention is a lighting device, including an optical system capable of generating a light beam and consisting of a light source and of a reflector, the optical system being mounted on a chassis by way of a fixed point including a ball-joint articulation.

According to the present invention, the optical system is held on the chassis by a second elastic link and by a third link capable of being put into motion by an actuator, preferably a single actuator.

According to other advantageous and non-limiting characteristics of the invention:

the optical system further includes an arm capable of coming into abutment on the chassis under the effect of the actuator;

the chassis includes a housing for accommodating the arm of the optical system, the housing allowing rotational movements of the arm on itself;

the chassis includes at least one wing for guiding the arm of the optical system towards the housing;

the second elastic link includes an elastic means springing, rearwards, a rod integral with the optical system;

the rod integral with the optical system constitutes a first axis of rotation for the optical system, with the fixed point including a ball-joint articulation.

According to a first embodiment:

the rod is integral with the optical system by way of a ball-joint link;

the rod integral with the optical system includes a first end stop sprung rearwards by the elastic means;

the rod integral with the optical system includes a second end stop limiting the rearwards travel of the rod;

the third link includes a rod mounted in ball-joint fashion on the optical system, and capable of being put into translational motion by the actuator held on the chassis.

According to a second embodiment:

the rod integral with the optical system is capable of sliding in an oblong aperture of the chassis;

the rod integral with the optical system is sprung rearwards from the oblong aperture by an elastic means;

the rod integral with the optical system is integral with a pinion or with a toothed sector capable of being put into rotational movement;

the pinion or the toothed sector is capable of being put into rotational movement by a rack gear put into motion by a linear actuator.

the pinion or the toothed sector is capable of being put into rotational movement by a second pinion integral with the output shaft of a rotary actuator;

the toothed sector includes a circular part and a straight-line part;

the output shaft of the rotary actuator is accommodated, so as to rotate, in a bore of the chassis.

In both these embodiments, the chassis can be oriented in elevation and in azimuth.

A further subject of the invention is the above-described device, in which the optical system comprises a single reflector and, preferably, a single light source. Advantageously, the optical system fulfils at least three functions, especially a turning-assistance function, a fog lamp function and a main-beam function.

Other objects, characteristics and advantages of the present invention will emerge clearly from the description which will now be given of an embodiment example given in a non-limiting way by reference to the attached drawings.

DESCRIPTION OF SOME PREFERRED EMBODIMENTS OF THE INVENTION

In the various figures, elements which are identical or which play the same role are allocated the same reference marks, possibly increased by 100.

Figure 1:
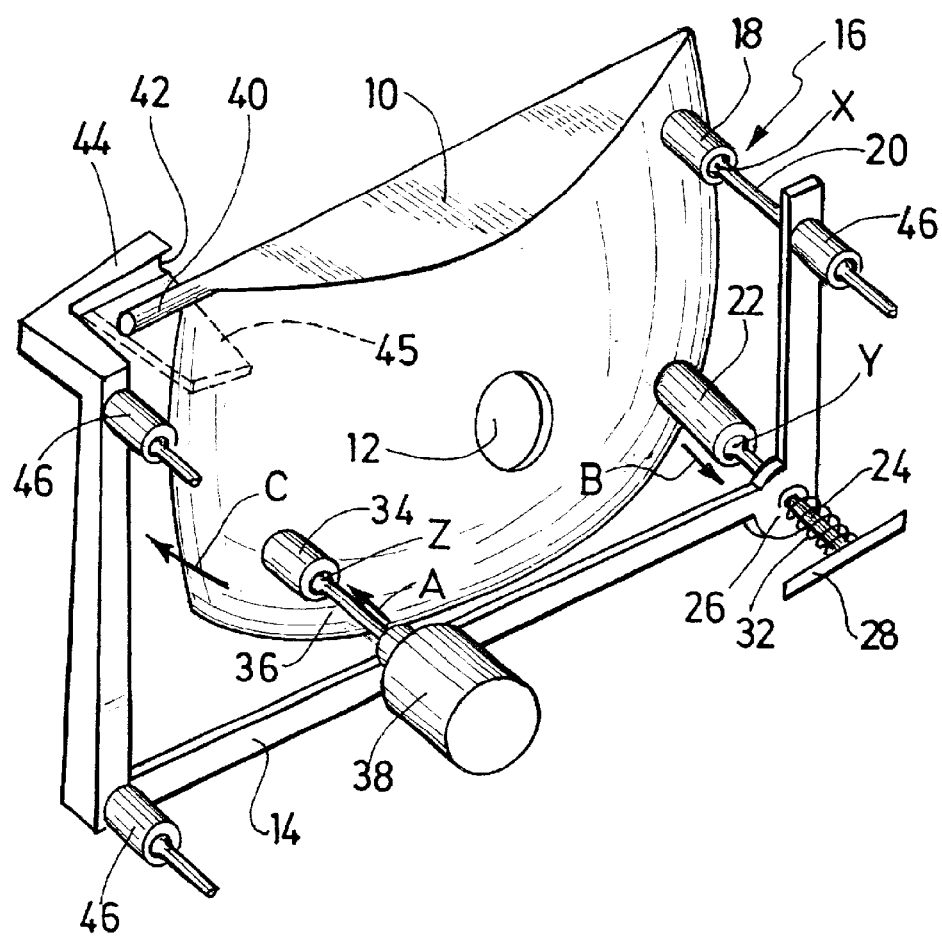
FIG. 1 represents a diagrammatic view in perspective of a variable-orientation lighting device according to the present invention, in a first position.

FIG. 1 represents a diagrammatic view in perspective of the rear of a variable-orientation lighting device produced according to the present invention.

Figure 2:
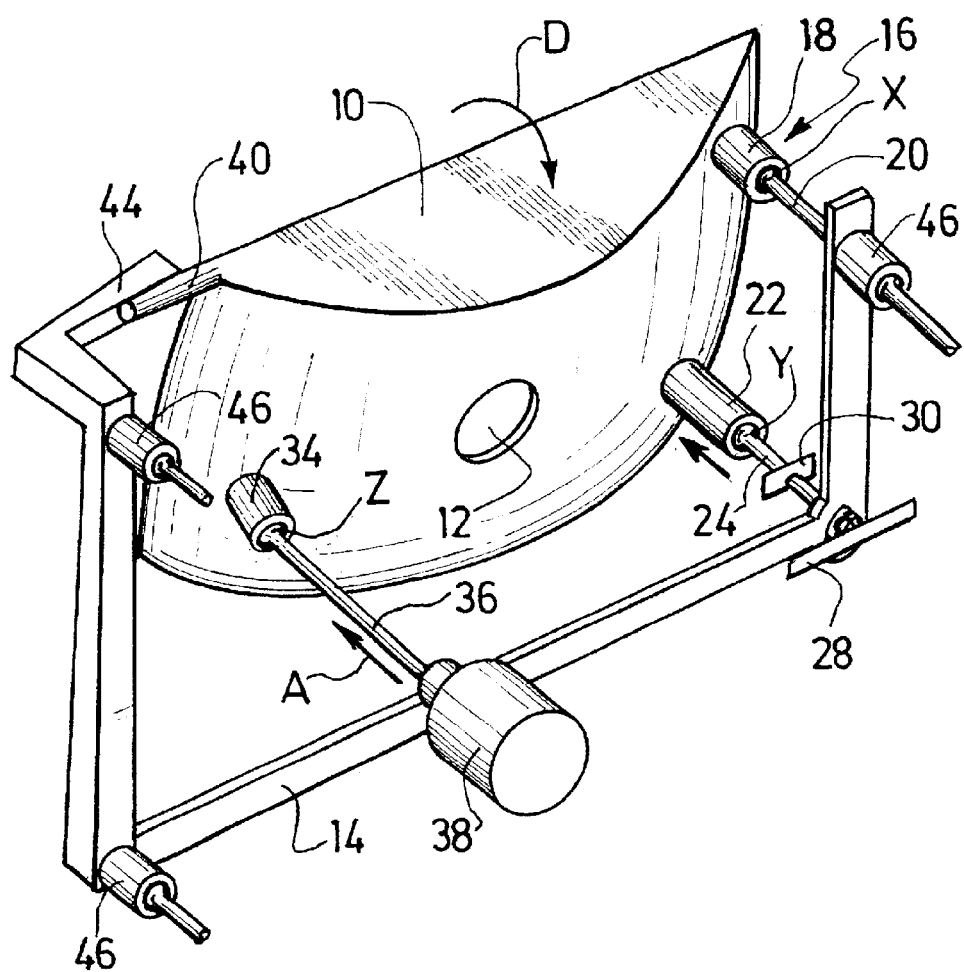
FIG. 2 represents the lighting device of FIG. 1 in a second position.

By convention, in the present description, "forward" is the name given to the direction in which the light beam is emitted, and "rear" the opposite direction. Thus in FIGS. 1 and 2 is seen the nonreflecting face of a reflector 10, in which a lamp hole 12 has been provided for a light source (not represented) to be inserted and held in place. Conventionally, the light rays emitted by the light source are reflected by the reflecting face of the reflector 10 in order to form a light beam. Depending on the geometry of the reflector 10, and, if appropriate, on the optical configurations provided on enclosing glazing (not represented) of the lighting device, the light beam will have a predetermined photometry and spatial distribution.

The reflector 10 is held in position by three non-aligned points. According to the present invention, the reflector 10 is mounted on a chassis 14 by way of a fixed point 16 of the ball-joint articulation type. Such a ball-joint articulation may, for example, include a shank 18, integral with the reflector 10, and trapping a ball joint X formed at the extremity of a rod 20, integral with the chassis 14. Needless to say, the rod 20 could be integral with the reflector 10 and the shank 18 integral with the chassis 14.

The reflector 10 is formed with a second shank 22, trapping a ball joint y formed at the extremity of rod 24 capable of sliding in an aperture 26 of the chassis 14. More precisely, the rod 24 is formed with two end stops 28 and 30 (FIG. 2) limiting the travel of the rod 24 with respect to the chassis 14. A spring 32 is interposed between the chassis 14 and the end stop 28, so as to spring this end stop, and thus the rod 24, rearwards. The shank 22 and the rod 24 thus constitute an elastic link form the reflector 10 onto the chassis 14.

The reflector 10 is formed with a third shank 34, trapping a ball joint Z formed at the extremity of a rod 36 capable of being put into motion by a linear actuator 38 fixed to the chassis 14.

Finally, the reflector 10 is formed with an arm 40 intended to interact with a housing 42 provided in a part 44 of the chassis 14. For preference, the arm 40 is cylindrical, and the housing 42 features a semi-cylindrical concave bottom with a radius of curvature substantially equal to the radius of the arm 40.

On reading the foregoing, it will have been understood how the invention can be implemented. In a first position of the actuator 38, represented in FIG. 1, the rod 36 occupies an extreme rear position. In this position, the arm 40 is at a distance from the housing 42, and the rod 24 also occupies its rear rest position, under the action of the spring 32, the end stop 30 of the rod 24 being in contact with the chassis 14. The reflector then projects a light beam in a first direction, when the light source is lit.

When the actuator 38 is driven, it puts the rod 36 into forward motion, in the direction of the arrow A. In this movement, the rod 36, by way of its end ball joint Z, drives the shank 34 forwards. With the rod 24 still being sprung, at the end stop, rearwards in the direction of the arrow B by the spring 32, the reflector 10 then performs a rotational movement about a first axis passing through the centre of the ball joints X and Y, in the direction of the arrow C in FIG. 1. In this movement, the light beam emitted by the reflector 10 is displaced along a first line perpendicular to the first axis X-Y, for example a horizontal line from left to right.

This rotational movement of the reflector 10 is continued until the arm 40 comes into abutment on the far end of the housing 42. Advantageously, provision can be made for the chassis 14 to be formed with two parallel wings 45, only one having been represented in dashed lines in FIG. 1 for the clarity of the drawing, so as to guide the arm 40 in its movement towards the housing 42. The two wings 45 can be joined together rearwards in order to prevent the arm 40 leaving the space which they define between them under the effect of the vibration to which the motor vehicle is subjected while it is in use.

The reflector 10 then lies in an intermediate position. If the rod 36 carries on with its forward movement, it then causes the rod 24 to be put into motion, which, in its turn, is displaced forwards, compressing the spring 32. The reflector 10 then performs a rotational movement about a second axis passing through the centre of the ball joint X and through the axis of the arm 40 coinciding with the axis of the housing 42, in the direction of the arrow D in FIG. 2.

Figure 3:
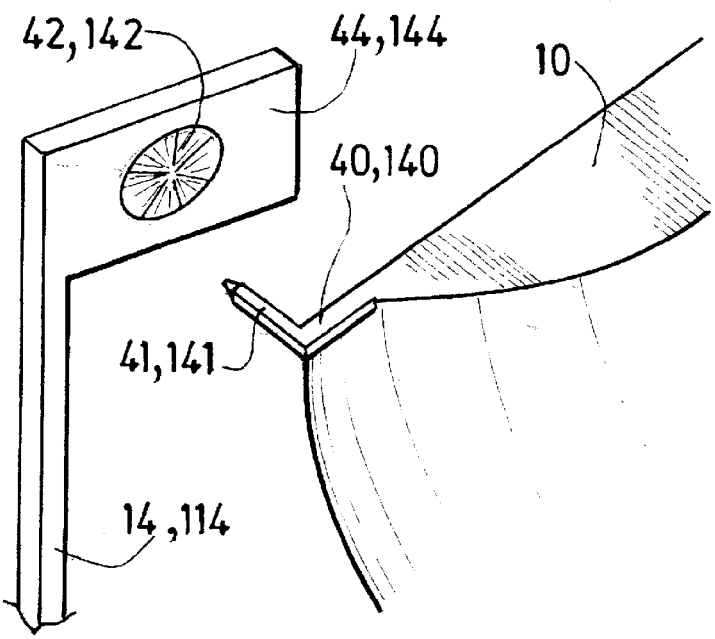
FIG. 3 represents a partial view in perspective of an embodiment variant of the lighting device of FIG. 1.

Advantageously, the axis of the semi-cylindrical housing 42, formed in the part 44 of the chassis 14, would be oriented in such a way as to pass through the centre of the ball joint X, formed a the extremity of the rod 20 which is integral with the chassis 14. In a variant, as has been represented in FIG. 3, it would be possible to provide for the arm 40 to be formed with a projection 41, the pointed extremity of which would be accommodated in a housing 42. The reflector 10 would then perform a rotational movement about a second axis passing through the centre of the ball joint x and through the vertex of the housing 42.

In this movement, the light beam emitted by the reflector 10 is displaced along a second line perpendicular to the second axis X-42, for example a rising vertical line. This movement may be continued until the end stop 28 of the rod 24 comes into contact with the chassis 14, or onto an end stop formed on it and provided for this purpose. The reflector 10 then lies in a second, extreme forward position.

When the actuator 38 is driven so that the rod 36 comes backwards again, the rod 36 then brings the shank 34 back rearwards, while the spring 32 also springs the rod 24 rearwards, and thus the shank 22. The reflector 10 then performs a rotational movement about the axis X-42, in the direction counter to that of the arrow D in FIG. 2.

In this movement, the light beam emitted by the reflector 10 is displaced along the second line perpendicular to the second axis X-42, for example a downwards vertical line. This movement is continued until the end stop 30 of the rod 24 comes into contact with the chassis 14, or onto an end stop formed on it and provided for this purpose. The reflector 10 then again lies in the intermediate position.

If the rod 36 carries on with its rearwards movement, it then causes a separation between the arm 40 or the projection 41 and the housing 42. The reflector 10 then performs a rotational movement about the first axis, passing through the centre of the ball joints X and Y in the direction contrary to that of the arrow C in FIG. 1. In this movement, the light beam emitted by the reflector 10 is displaced along the first line perpendicular to the first axis X-Y, for example a horizontal line from right to left, until it regains the first extreme position represented in FIG. 1.

Hence, according to the present invention, a lighting device with variable orientation along two axes has actually been produced, which uses only a single actuator in order to put the lighting device into motion along these two axes. The movements of the light beam thus implemented can be of any predetermined amplitude, along the first line by arranging the third shank 34 nearer to or further from the axis X-Y, and/or along the second line by arranging the third shank 34 nearer to or further from the axis X-42.

It would also be possible to make provision to set the rod 36 into motion other than by a linear actuator, for example using a stepper motor, the rotary output shaft of which would be equipped with a pinion meshing with a rack gear formed on the rod 36, or else a motor the output shaft of which would be shaped as a worm screw, interacting with a nut integral with the rod 36.

It would thus be possible to control the movements of the reflector 10 so as to orient the light beam in different directions. It would be possible, for example, to provide for the intermediate position to be the position of rest of the actuator 38, and hence of the reflector 10, and, in this position, for the beam emitted to be a fog lamp beam. If, from the intermediate position, the rod 36 is driven forwards, the light beam is raised, and may come to supplement the beam of a main headlamp. Conversely, if, from the intermediate position, the rod 36 is driven rearwards, the light beam is oriented laterally, leftwards in the example of FIGS. 1 and 2, and may come to illuminate the areas outside the longitudinal axis of the vehicle, for example areas situated within a turn which the vehicle is on the point of entering.

According to another application example, it would be possible to provide for the second position, in which the rod 36 is in its extreme forward position, to be the position of rest of the actuator 38 and, in this position, for the light beam emitted to be a main headlamp beam, and for the first position, in which the rod 36 is in its extreme rear position, to be a position intended to illuminate areas situated within a turn which the vehicle is on the point of entering.

It would also be possible to provide for the chassis 14 itself to be able to be oriented, in elevation and in azimuth, for example by way of shanks 46, so as to adjust the orientation of the reflector 10 by the use of electric or manual actuators (not represented) and to make the light beam comply with the regulations, for example in the intermediate position if that is the rest position and for the beam emitted to be a fog lamp beam, or in the extreme forward position if that corresponds to a mean headlamp beam.

Figure 4:
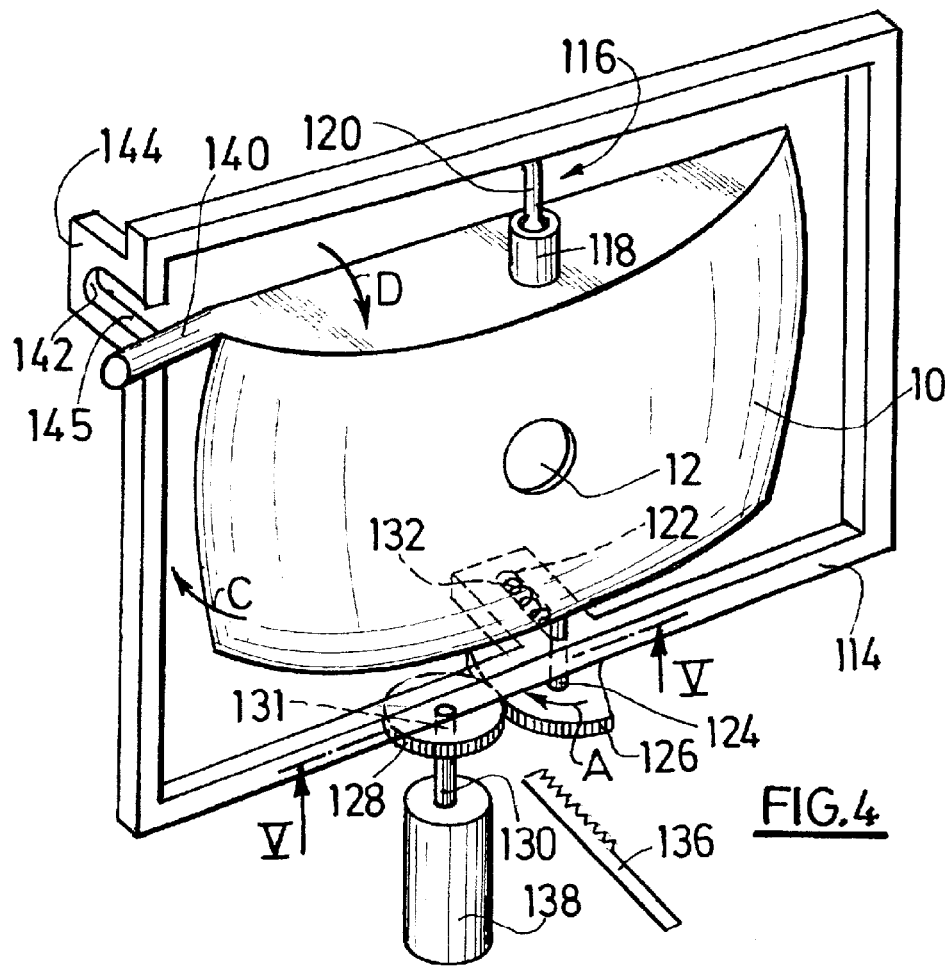
FIG. 4 represents a diagrammatic view in perspective of a second embodiment of the invention.

FIG. 4 represents a second embodiment of the present invention. According to this embodiment, the reflector 10 is mounted on a chassis 114 by way of a fixed point 116 of the ball-joint-articulation type. Such a ball-joint articulation may, for example, include a shank 118, integral with the reflector 10, trapping a ball joint X' formed at the extremity of a rod 120, integral with the chassis 14. Needless to say, the rod 120 could be integral with the reflector 10 and the shank 118 integral with the chassis 114.

Figure 5:
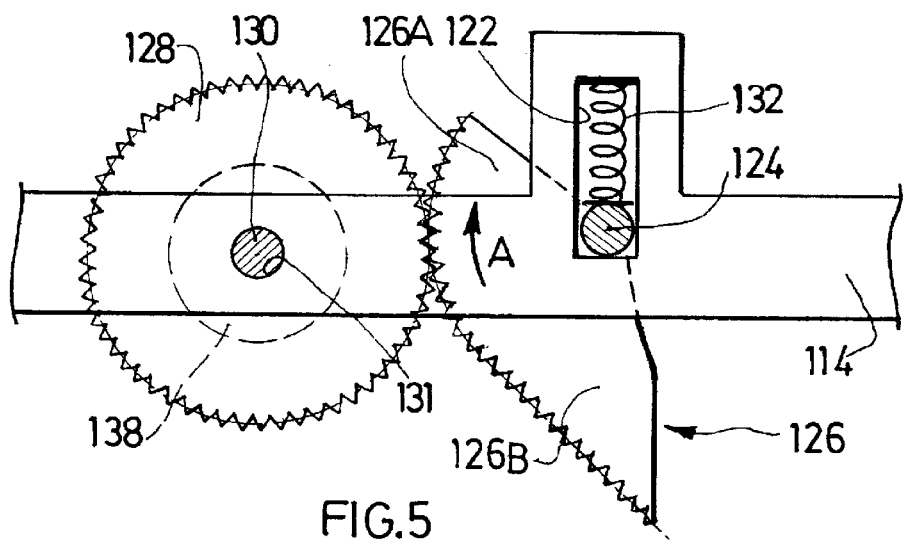
FIG. 5 represents a sectional view along the line V—V of FIG. 4.

The reflector 10 is integral with a shaft 124, passing through an oblong cavity 122 formed in the chassis 114 and integral with a toothed sector 126. The toothed sector 126 includes a circular part 126A, and a straight-line part 126B (FIG. 5). The shaft 124 and the shank 118 are aligned, as has been represented in FIG. 4, in such a way that the line joining them forms an axis substantially perpendicular to the optical axis of the reflector 10 and passing through this optical axis. The toothed sector 126 meshes with a pinion 128, capable of being put into rotational movement by a rotary actuator 138.

Figure 6:
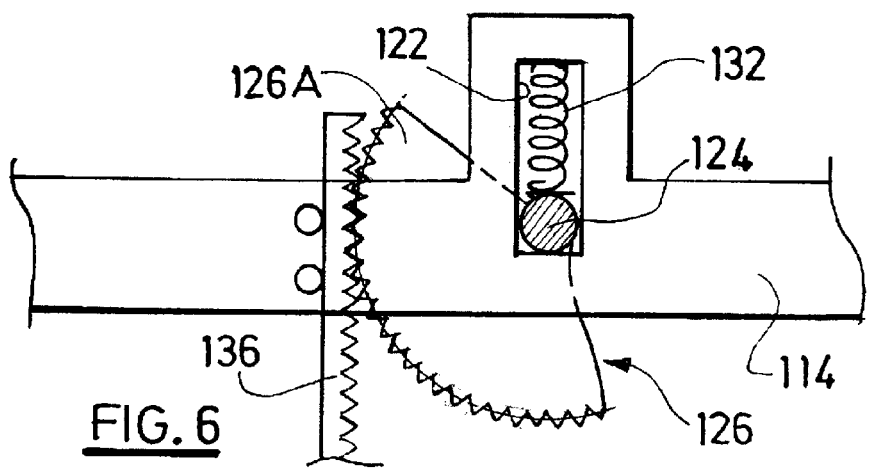
FIG. 6 is a view similar to that of FIG. 5 of a variant of the second embodiment.

In a variant, as has been represented in FIG. 6, the toothed sector 126 meshes with a rack gear 136, capable of being put into translational movement by a linear actuator (not represented). According to this variant, the toothed sector 126 is circular.

The pinion 128 or the actuator 138 have a rotational axis which is fixed with respect to the chassis 114. To that end, provision can be made for the axis 130 linking them to be held, so as to rotate, in a bore 131 of the chassis. In a variant, the rack gear 136 is capable of being driven in translational movement along a fixed direction with respect to the chassis 114. Provision could then be made for the side of the rack gear 136 opposite the one which meshes with the toothed sector 126 to bear on one or more end stops 135 integral with the chassis 114, as has been represented in FIG. 6.

As can be seen better in FIG. 5, the shaft 124 integral with the reflector 10 is accommodated in the oblong cavity 122 of the chassis, while being capable of sliding in this cavity. The shaft 124 is subjected to the action of a compression spring 132, springing the shaft 124 rearwards, and allowing the rotational movements of the shaft 124 on itself.

Finally, as in the preceding embodiment, the reflector 10 is formed with an arm 140 intended to interact with a housing 142 provided in a part 144 of the chassis 114. The arm 140 is preferably cylindrical, and the housing 142 preferably exhibits a semi-cylindrical concave far end with radius of curvature substantially equal to the radius of the arm 140.

In a first position of the actuator 138, which is represented in FIGS. 4 and 5, the toothed sector 126, integral with the reflector 10, occupies an extreme angular position, in which the arm 140 is at a distance from the housing 142, and the shaft 124 likewise occupies its rear, rest position in the cavity 122, under the action of the spring 132. The reflector, when the light source is lit, then projects a light beam in a first direction.

When the actuator 138 is driven, it puts the pinion 128 and the toothed sector 126 into rotation, the latter turning in the direction of the arrow A in the FIGS. 4 and 5. In this movement, the shall 124, integral with the toothed sector 126 and with the reflector 10, entrains the latter in a rotational movement about a first axis passing through the centre of the ball joint X' and the far end of the cavity 122, in the direction of the arrow C in FIG. 4. In this movement, the light beam emitted by the reflector 10 is displaced along a first line perpendicular to this first axis, for example a horizontal line from left to right.

This rotational movement of the reflector 10 carries on until the arm 140 comes into abutment on the far end of the housing 142. According to this embodiment, it is not necessary to provide parts for guiding the movements of the arm 140, since its position is determined by the walls of the cavity 122, by the shank 118 and by the angular position of the toothed sector 126.

The reflector 10 then lies in an intermediate position. If the toothed sector 126 is driven further in rotation in the direction of the arrow A, it then meshes with the straight-line part 126B of the toothed sector 126, and thus causes the shaft 124 to be put into motion, which is displaced then in its turn forwards in the cavity 122, compression the spring 132. The reflector 10 then performs a rotational movement about a second axis passing through the centre of the ball joint X' and through the axis of the arm 140 coinciding with the axis of the housing 42, in the direction of the arrow D in FIG. 4.

Advantageously, the axis of the semi-cylindrical housing 142, formed in the part 144 of the chassis 114, would be oriented in such a way as to pass through the centre of the ball joint X', formed at the extremity of the rod 120 integral with the chassis 114. In a variant, it would be possible, as in the preceding embodiment, to provide for the arm 142 to be formed with a projection 141 the pointed extremity of which would be accommodated in a conical housing 142. The reflector 10 would then carry out a rotational movement about a second axis passing through the centre of the ball joint X' and through the vertex of the conical housing 142.

In this movement, the light beam emitted by the reflector 10 is displaced along a second line perpendicular to the second axis X'-142, for example a rising vertical line. This movement can be continued until the shaft 124 arrives at the end stop in the far end of the cavity 122, or on an end stop (not represented) formed in it. The reflector 10 then lies in a second extreme forward position. When the toothed sector 126 is driven in the direction opposite to that of the arrow A, the shall 124 then brings the reflector 10 back rearwards by way of the straight-line part 126B of the toothed sector 126, the spring 132 springing the shaft 124 rearwards. The reflector 10 thus performs a rotational movement about the axis X'-142, in the direction opposite to that of the arrow D if FIG. 4.

In this movement, the light beam emitted by the reflector 10 is displaced along the second line perpendicular to the second axis X'-142, for example a downwards vertical line. This movement carries on until the shaft 124 comes back to the far end of the cavity 122. The reflector 10 then again lies in the intermediate position.

If the toothed sector 126 carries on with its rotational movement in the direction opposite to that of the arrow A in FIG. 4, it then meshes with the circular part 126A of the toothed sector 126, and then causes separation between the arm 140 or the projection 141 and the housing 142. The reflector 10 then carries out a rotational movement about the first axis in the direction opposite to that of the arrow C in FIG. 4. In this movement, the light beam emitted by the reflector 10 is displaced along the first line perpendicular to the first axis, for example a horizontal line from right to left, until it regains the first extreme position represented in FIG. 4.

Hence according to the present invention a lighting device with variable orientation along two axes has actually been produced, which uses only a single actuator to put the lighting device into movement along these two axes. The movements of the light beam thus caused may be of any predetermined amplitude with the desired precision.

It would also be possible to provide for the chassis 114 itself to be able to be oriented, in elevation and in azimuth, so as to adjust the orientation of the reflector 10 by the use of electric or manual actuators and to make the light beam comply with the regulations, for example in the intermediate position if that is the rest position, and for the beam emitted to be a fog lamp beam, or in the extreme forward position if that corresponds to a main headlamp beam.

What is claimed is:

1. A lighting device, comprising an optical system capable of generating a light beam comprising a light source and a reflector, the optical system being mounted on a chassis by way of a fixed point including a ball-joint articulation, a second elastic link and by a third link, and wherein actuation of the third link adjusts the lighting system along both a first axis and second axis.

2. A device according to claim 1, wherein the third link includes a rod mounted in ball-joint fashion on the optical system, and an actuator held on the chassis and connected to the rod to put the rod into translational motion.

3. A device according to claim 1, wherein the chassis can be oriented in elevation and in azimuth.

4. A device according to claim 1, wherein the optical system comprises a single reflector and a single light source.

5. A device according to claim 1, wherein the optical system fulfills at least three functions, including a turning-assistance function, a fog lamp function and a main-beam function.

6. A device according to claim 1, wherein the optical system further includes an arm that moves into abutment with the chassis when the device is actuated.

7. A device according to claim 6, wherein the chassis includes a housing for accommodating the arm of the optical system, the housing allowing rotational movements of the arm on itself.

8. A device according to claim 7, wherein the chassis includes at least one wing for guiding the arm of the optical system towards the housing.

9. A device according to claim 1, wherein the second elastic link includes an elastic means springing, rearwards, a rod integral with the optical system.

10. A device according to claim 9, wherein the rod is integral with the optical system by way of a ball-joint link.

11. A device according to claim 10, wherein the rod integral with the optical system includes a first end stop sprung rearwards by the elastic means.

12. A device according to claim 11, wherein the rod integral with the optical system includes a second end stop limiting the rearwards travel of the rod.

13. A lighting device, comprising an optical system capable of generating a light beam and comprising a light source and a reflector, the optical system being mounted on a chassis by way of a fixed point including a ball-joint articulation, a rod integral with the optical system and constituting a first axis of rotation of the optical system, and wherein movement of the rod adjusts the lighting system along both the first axis and a second axis.

14. A device according a claim 13, wherein the rod integral with the optical system is inserted in, and slideable along the length of, an oblong aperture of the chassis.

15. A device according to claim 14, wherein the rod integral with the optical system is sprung rearwards from the oblong aperture by an elastic means.

16. A device according to claim 14, wherein the rod integral with the optical system is integral with a rotatable pinion or with a rotatable toothed sector.

17. A device according to claim 16, wherein the rotatable pinion or the rotatable toothed sector is put into rotational movement by a rack gear put into motion by a linear actuator.

18. A device according to claim 16, wherein the rotatable pinion or the rotatable toothed sector is put into rotational movement by a second pinion integral with the output shaft of a rotary actuator.

19. A device according to claim 18, wherein the toothed sector includes a circular part and a straight-lined part.

20. A device according to claim 18, wherein the output shaft of the rotary actuator is accommodated, so as to rotate, in a bore of the chassis.

* * * * *